United States Patent
Sumikawa et al.

(10) Patent No.: US 6,356,655 B1
(45) Date of Patent: Mar. 12, 2002

(54) APPARATUS AND METHOD OF BITMAP IMAGE PROCESSING, STORAGE MEDIUM STORING AN IMAGE PROCESSING PROGRAM

(75) Inventors: Michitoshi Sumikawa, Yamato; Hiroyasu Takahashi, Yokohama, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/132,943

(22) Filed: Aug. 11, 1998

(30) Foreign Application Priority Data

Oct. 17, 1997 (JP) .............................. 9-285709

(51) Int. Cl.[7] .............................. G06K 9/34; G06K 9/48; G06K 9/62
(52) U.S. Cl. ..................... 382/175; 382/199; 382/209
(58) Field of Search ................................. 382/190, 201, 382/218, 173, 175, 193, 319, 291, 292, 176, 180, 199, 209

(56) References Cited

U.S. PATENT DOCUMENTS

| | | | | |
|---|---|---|---|---|
| 5,305,396 A | * | 4/1994 | Betts et al. ................... | 382/175 |
| 5,563,403 A | * | 10/1996 | Bessho et al. ................ | 382/289 |
| 5,588,072 A | * | 12/1996 | Wang ........................... | 382/176 |
| 5,745,600 A | * | 4/1998 | Chen et al. ................... | 382/218 |
| 5,835,640 A | * | 11/1998 | Clements ..................... | 382/289 |
| 5,923,782 A | * | 7/1999 | Chhabra et al. .............. | 382/202 |

FOREIGN PATENT DOCUMENTS

| | | | | |
|---|---|---|---|---|
| JP | 61-289476 | 12/1986 | ............ | G06K/9/20 |
| JP | 2-23492 | 1/1990 | ............ | G06K/9/20 |
| JP | 9-138837 | 5/1997 | ............ | G06K/9/20 |
| JP | 9-185675 | 7/1997 | ............ | G06K/9/20 |

* cited by examiner

Primary Examiner—Amelia M. Au
Assistant Examiner—Mehrdad Dastouri
(74) Attorney, Agent, or Firm—Louis P. Herzberg

(57) ABSTRACT

An object is to enable designation of character frames and recognition of characters even where a document does not have any page mark or reference mark nor does a scanner have a function for detecting an edge of the document. Also, to enable identification processing of a bitmap image in an accerelated manner by comparing bitmap images on the basis of a circumscribed rectangle, which is formed solely from horizontal line segments that are recognizable at high-speed. In a case of identifying a bitmap image comprising horizontal line segments such as character frames 323, 331 or grid lines 301, 303 on a document (as done in an OCR when it detects a document 300 without page marks but with black character frames and recognizes characters), the horizontal line segments are extracted as a feature of the document, a circumscribed rectangle 350 is formed within an area generated by the horizontal line segments such that it is used as information for identifying an estimated basis of character frame's positions and a class of the document. Applying this to an OCR, it becomes possible to identify even a document without page marks or reference marks thereon. Also, comparing the extracted horizontal line segments themselves with horizontal line segments of pre-registered document definition set to determine similarity between them, it becomes possible to identify a document in a more precise manner.

11 Claims, 12 Drawing Sheets

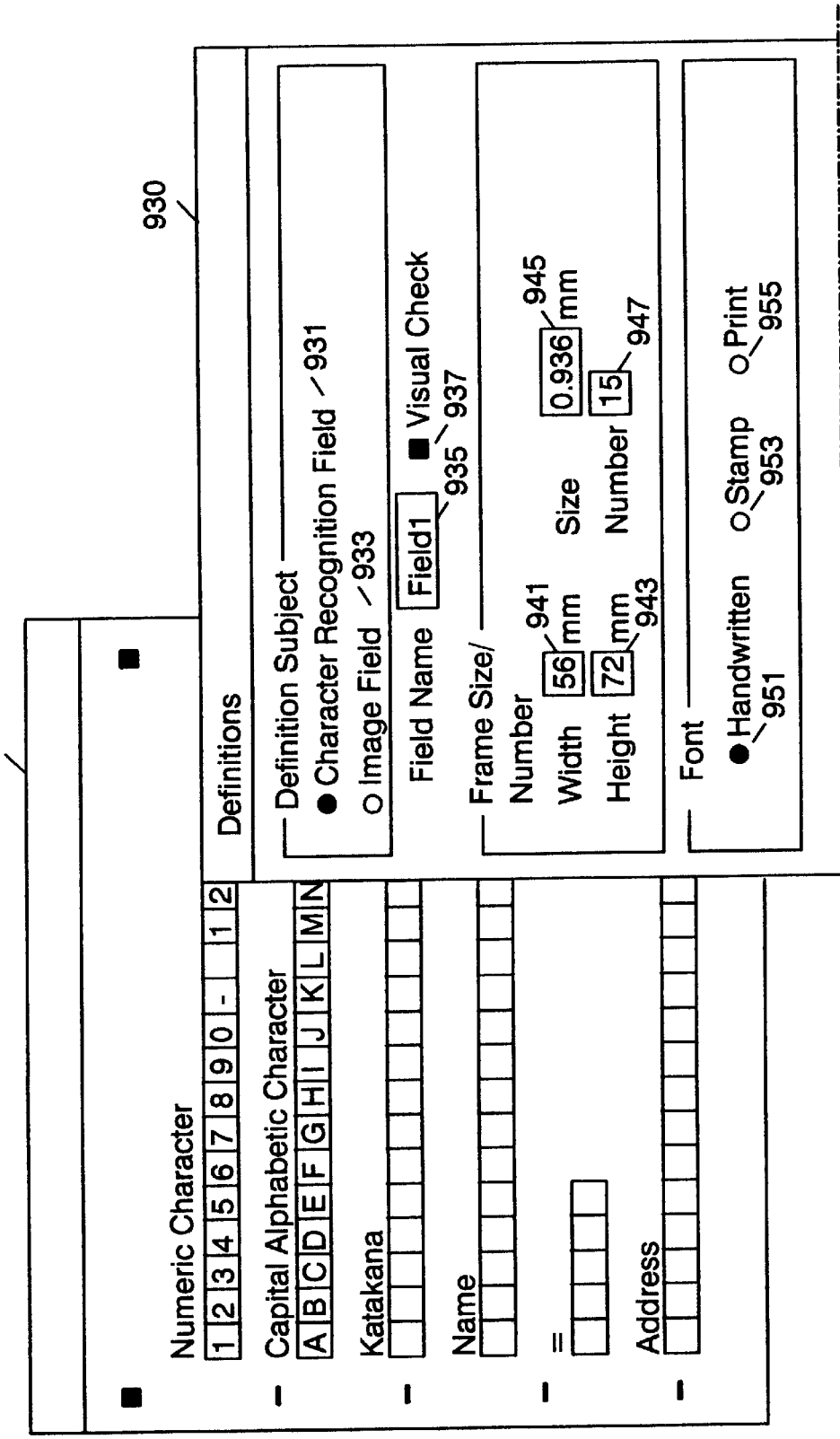

4. Administration of this zone — 307

| | A. Very good | B. Good | C. Average | D. Inferior | E. Very inferior |
|---|---|---|---|---|---|
| a. Reception | ⊙ | □ | □ | □ | □ |
| b. Display | □ | ⊙ | □ | □ | □ |
| c. Materials | □ | ⊙ | □ | □ | □ |

5. Please write down your another opinion, request and the like.

[ 319 ]

Name: `M.Sumikawa` — 323

Company / Organization Name: `IBM Japan` — 331

Department / Section Name: `AP Solution Dept.` — 335

Tel: `03-1234-5678` — 339

E-MAIL: `Sumikawa@vnet.ibm.com` — 343

- Thank you for your cooperation -

4. Administration of this zone — 307

|  | A. Very good | B. Good | C. Average | D. Inferior | E. Very inferior |
|---|---|---|---|---|---|
| a. Reception | ◉ | ☐ | ☐ | ☐ | ☐ |
| b. Display | ☐ | ◉ | ☐ | ☐ | ☐ |
| c. Materials | ☐ | ◉ | ☐ | ☐ | ☐ |

5. Please write down your another opinion, request and the like.

[319]

| Name | M . S u m i k a w a | 323 |
| Company / Organization Name | I B M   J a p a n | 331 |
| Department / Section Name | A P   S o l u t i o n   D e p t . | 335 |
| Tel | 0 3 - 1 2 3 4 - 5 6 7 8 | 339 |
| E-MAIL | Sumikawa@vnet.ibm.com | 343 |

345

- Thank you for your cooperation -

APPARATUS AND METHOD OF BITMAP IMAGE PROCESSING, STORAGE MEDIUM STORING AN IMAGE PROCESSING PROGRAM

FIELD OF THE INVENTION

This invention relates to an image processing method and, more particularly, to a method of identifying a bitmap image.

BACKGROUND ART

In the past, as a part of document identification and character recognition processing, the following schemes have been adopted for specifying a position of a character frame or the like on an image:

(1) a first scheme using a page mark or a reference mark as a base (datum);

(2) a second scheme using an edge of a document as a base, provided that a scanner has a function for detecting such an edge against a black background of the present document; and (3) a third scheme detecting black character frames individually and matching these frames with predefined frames.

However, the first scheme (1) requires to provision page marks or reference marks on a document and, thus, it has limitations such as narrowing areas available to a user or the like. Also, this scheme has a problem that it cannot handle a document without page marks or reference marks thereon.

The second scheme (2) has a problem in that it cannot be applied in the absence of an expensive scanner having the above function dedicated to OCR use.

The third scheme (3) requires extraction of not only horizontal line segments but also vertical line segments as a feature for detecting character frames and, thus, it is subjected to a degraded processing speed.

Also, this scheme requires as its preprocessing to perform skew correction of an image itself for removing any skew, which in turn leads to further degradation of processing. This is significantly worsened in a scheme that uses content of a document for identification purposes, since its analytical logic tends to be complex where there exists any skew or positional deviation.

SUMMARY OF THE INVENTION

It is, therefore, an object of this invention to solve the problems by enabling designation of a character frame and recognition of a character even where a document does not have any page mark or reference mark nor does a scanner have a function for detecting an edge of the present document.

It is another object of this invention to enable identification processing of a bitmap image in an accerelated manner by comparing bitmap images on the basis of a circumscribed rectangle, which is formed solely from horizontal line segments that are recognizable at high-speed.

It is another object of this invention to enable identification processing of a bitmap image in an accerelated manner by mapping an image to an ideal image without performing skew correction of the image itself.

It is another object of this invention to simplify involved logic by treating four corners of a circumscribed rectangle as virtual page marks such that an existing logic designed to detect a character frame on the basis of a conventional page mark may be diverted to detection of the virtual page marks.

It is another object of this invention to reduce burdens of an operator who is to create a document definition set by making it possible to add definition information of a circumscribed rectangle or horizontal line segments to an existing document definition set such that information of the conventional document definition set may be utilized as it is.

It is another object of the present invention to provide a means for solving the problems by identifying a bitmap image comprising horizontal line segments of character frames or grid lines on a document (as done in an OCR when it detects a document without page marks but with black character frames and recognizes characters). The horizontal line segments are extracted as a feature of the present document, a circumscribed rectangle is formed within an area generated by the horizontal line segments such that it is used as information for identifying an estimated basis of a character frame's position and a class of the present document. Applying this to an OCR, it becomes possible to identify even a document without page marks or reference marks thereon. Also, comparing the extracted horizontal line segments themselves with horizontal line segments of pre-registered document definition sets to determine similarity between them, it becomes possible to identify documents in a more precise manner.

In accordance with one aspect of this invention, there is provided a method of identifying a class of a bitmap image including a plurality of horizontal line segment images, the method being carried out on a bitmap image identifying apparatus that has a bitmap image definition set containing information for identifying a plurality of bitmap images, comprising the steps of:

(a) scanning said bitmap image to extract information for specifying a plurality of horizontal line segments;

(b) extracting information for specifying a circumscribed rectangle based on said information for specifying a plurality of horizontal line segments; and (c) checking whether or not said extracted information for specifying a circumscribed rectangle is similar to pre-registered information for specifying a circumscribed rectangle in said bitmap image definition set.

Note here that, in the claims of the present specification, the expression "bitmap image definition set" represents a concept corresponding with "document definition set" in a preferred embodiment of this invention, but it also covers any item that contains information for identifying classes of various bitmap images, including but not limited to documents. Also, in the claims of the present specification, the expression "horizontal line segment" means a line segment that is substantially parallel to a scanning direction of a bitmap image. Further, in the claims of the present specification, the expression "information for specifying horizontal line segments" represents a concept covering not only coordinates of two points that define a line segment, but also vector information or the like.

In accordance with another aspect of this invention, there is provided a method of identifying a class of a bitmap image including a plurality of horizontal line segment images, the method being carried out on a bitmap image identifying apparatus that has a bitmap image definition set containing information for identifying a plurality of bitmap images, comprising the steps of:

(a) scanning said bitmap image to extract information for specifying a plurality of horizontal line segments; and (b) checking whether or not said extracted information for specifying a plurality of horizontal line segments is similar to pre-registered information for specifying horizontal line segments in said bitmap image definition set.

In accordance with another aspect of this invention, there is provided a method of obtaining information for identifying a class of a bitmap image including a plurality of horizontal line segment images, comprising the steps of:
- (a) scanning said bitmap image to extract information for specifying a plurality of horizontal line segments;
- (b) extracting information for specifying a rectangle, which contains at least a portion of two of said plurality of horizontal line segments as its horizontal side, based on said information for specifying a plurality of horizontal line segments;
- (c) transforming said information for specifying a rectangle based on skew information calculated from said information for specifying a plurality of horizontal line segments; and
- (d) storing said transformed information for specifying a rectangle.

Note here that, in the claims of the present specification, the expression "rectangle" represents a concept corresponding with "circumscribed rectangle" in a preferred embodiment of this invention, but it also covers any rectangle, including but not limited to a circumscribed rectangle, which is formed based on particular horizontal line segments.

In accordance with another aspect of this invention, there is provided a method of recognizing a position of a character frame included in a bitmap image, comprising the steps of:
- (a) scanning said bitmap image to extract information for specifying a plurality of horizontal line segments;
- (b) extracting information for specifying a circumscribed rectangle based on said information for specifying a plurality of horizontal line segments;
- (c) extracting information for specifying a character frame included in said bitmap image; and
- (d) storing said extracted information for specifying a character frame as position information on the basis of one of vertexes of said circumscribed rectangle.

In accordance with another aspect of this invention, there is provided a bitmap image identifying apparatus for identifying a class of a bitmap image including a plurality of horizontal line segment images, comprising:
- (a) image input means for containing said bitmap image including a plurality of horizontal line segments;
- (b) a bitmap image definition set including information for identifying classes of a plurality of bitmap images; and
- (c) image analysis means (c1) for scanning said bitmap image to extract information for specifying a plurality of horizontal line segments, (c2) for extracting information for specifying a circumscribed rectangle based on said information for specifying a plurality of horizontal line segments, and (c3) for checking whether or not said extracted information for specifying a circumscribed rectangle is similar to pre-registered information for specifying a circumscribed rectangle in said bitmap image definition set.

In accordance with another aspect of this invention, there is provided a bitmap image identifying apparatus for identifying a class of a bitmap image including a plurality of horizontal line segment images, comprising:
- (a) image input means for containing said bitmap image including a plurality of horizontal line segments;
- (b) a bitmap image definition set including information for identifying classes of a plurality of bitmap images; and
- (c) image analysis means (c1) for scanning said bitmap image to extract information for specifying a plurality of horizontal line segments, and (c2) for checking whether or not said extracted information for specifying a plurality of horizontal line segments is similar to pre-registered information for specifying horizontal line segments in said bitmap image definition set.

In accordance with another aspect of this invention, there is provided a bitmap image processing apparatus for obtaining information for identifying a class of a bitmap image including a plurality of horizontal line segment images, comprising:
- (a) image analysis means (a1) for scanning said bitmap image to extract information for specifying a plurality of horizontal line segments, (a2) for extracting information for specifying a rectangle, which contains at least a portion of two of said plurality of horizontal line segments as its horizontal side, based on said information for specifying a plurality of horizontal line segments, and (a3) for transforming said information for specifying a rectangle based on skew information calculated from said information for specifying a plurality of horizontal line segments; and
- (b) a bitmap image definition set for storing said transformed information for specifying a rectangle.

In accordance with another aspect of this invention, there is provided a bitmap image processing apparatus for recognizing a position of a character frame included in a bitmap image, comprising:
- (a) image analysis means (a1) for scanning said bitmap image to extract information for specifying a plurality of horizontal line segments, (a2) for extracting information for specifying a circumscribed rectangle based on said information for specifying a plurality of horizontal line segments, and (a3) for extracting information for specifying a character frame included in said bitmap image; and
- (b) a bitmap image definition set for storing said extracted information for specifying a character frame as position information on the basis of one of vertexes of said circumscribed rectangle.

In accordance with another aspect of this invention, there is provided a storage medium for storing an image processing program executable on a bitmap image identifying apparatus that has a bitmap image definition set containing information for identifying a plurality of bitmap images, said image processing program identifying a class of a bitmap image including a plurality of horizontal line segment images, said image processing program comprising:
- (a) program code for indicating said bitmap image identifying apparatus to scan said bitmap image to extract information for specifying a plurality of horizontal line segments;
- (b) program code for indicating said bitmap image identifying apparatus to extract information for specifying a circumscribed rectangle based on said information for specifying a plurality of horizontal line segments; and
- (c) program code for indicating said bitmap image identifying apparatus to check whether or not said extracted information for specifying a circumscribed rectangle is similar to pre-registered information for specifying a circumscribed rectangle in said bitmap image definition set.

In accordance with another aspect of this invention, there is provided a storage medium for storing an image processing program executable on a bitmap image identifying apparatus that has a bitmap image definition set containing information for identifying a plurality of bitmap images, said image processing program identifying a class of a bitmap image including a plurality of horizontal line segment images, said image processing program comprising:

(a) program code for indicating said bitmap image identifying apparatus to scan said bitmap image to extract information for specifying a plurality of horizontal line segments; and (b) program code for indicating said bitmap image identifying apparatus to check whether or not said extracted information for specifying a plurality of horizontal line segments is similar to pre-registered information for specifying horizontal line segments in said bitmap image definition set.

In accordance with another aspect of this invention, there is provided a storage medium for storing an image processing program executable on a bitmap image processing apparatus, said image processing program obtaining information for identifying a class of a bitmap image including a plurality of horizontal line segment images, said image processing program comprising:

(a) program code for indicating said bitmap image processing apparatus to scan said bitmap image to extract information for specifying a plurality of horizontal line segments;

(b) program code for indicating said bitmap image processing apparatus to extract information for specifying a rectangle, which contains at least a portion of two of said plurality of horizontal line segments as its horizontal side, based on said information for specifying a plurality of horizontal line segments;

(c) program code for indicating said bitmap image processing apparatus to transform said information for specifying a rectangle based on skew information calculated from said information for specifying a plurality of horizontal line segments; and (d) program code for indicating said bitmap image processing apparatus to store said transformed information for specifying a rectangle.

In accordance with another aspect of this invention, there is provided a storage medium for storing an image processing program executable on a bitmap image processing apparatus, said image processing program recognizing a position of a character frame included in a bitmap image, said image processing program comprising:

(a) program code for indicating said bitmap image processing apparatus to scan said bitmap image to extract information for specifying a plurality of horizontal line segments;

(b) program code for indicating said bitmap image processing apparatus to extract information for specifying a circumscribed rectangle based on said information for specifying a plurality of horizontal line segments;

(c) program code for indicating said bitmap image processing apparatus to extract information for specifying a character frame included in said bitmap image; and (d) program code for indicating said bitmap image processing apparatus to store said extracted information for specifying a character frame as position information on the basis of one of vertexes of said circumscribed rectangle.

BRIEF DESCRIPTION OF THE DRAWINGS

These and other objects, features, and advantages of the present invention will become apparent upon further consideration of the following detailed description of the invention when read in conjunction with the drawing figures, in which.

DESCRIPTION OF AN EMBODIMENT OF THE INVENTION

Figure 1:
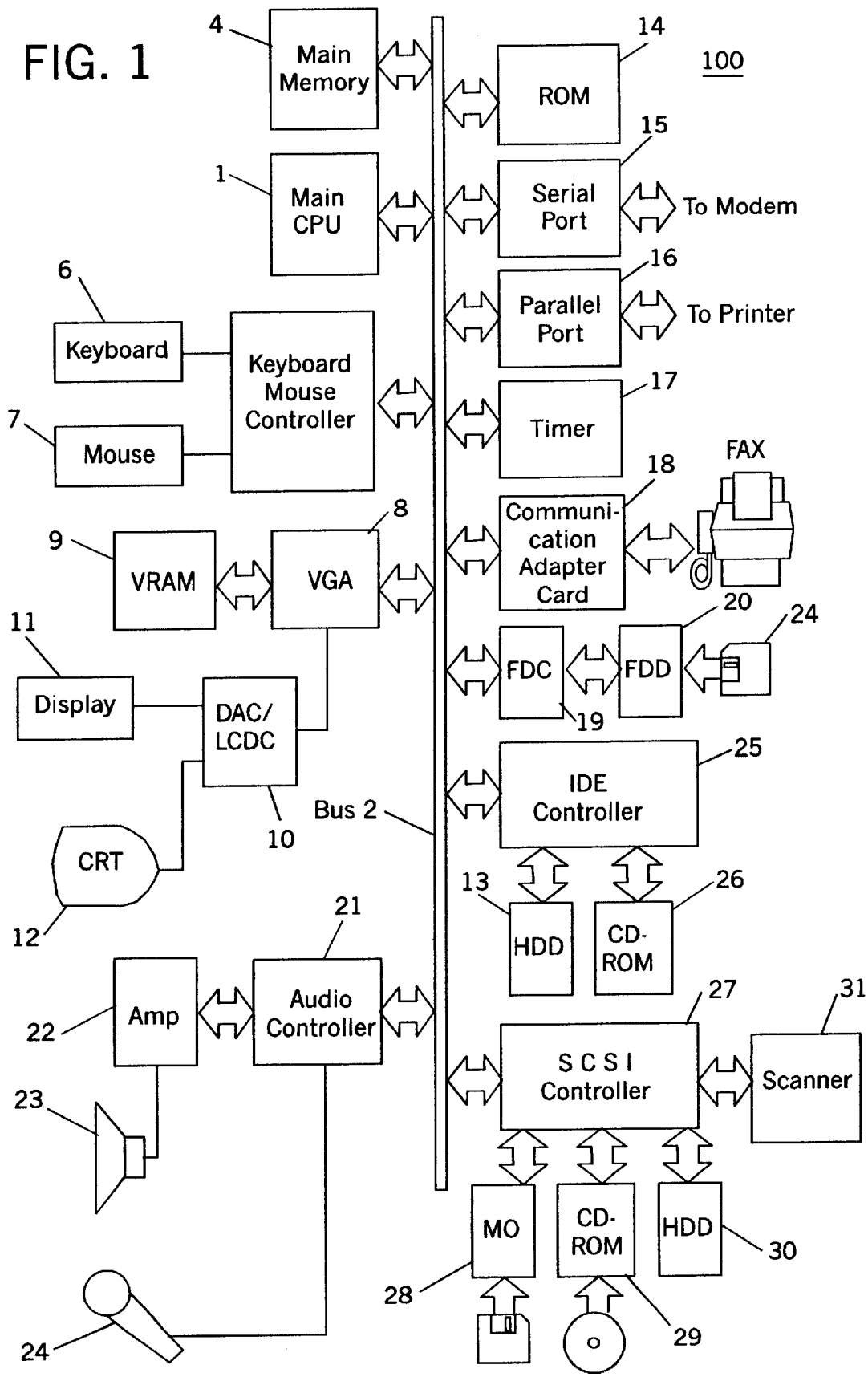
FIG. 1 is a block diagram showing a hardware configuration.

Now, with reference to the drawings, an embodiment of this invention will be described. Referring to FIG. 1, there is schematically shown a hardware configuration for implementing an image processing system 100 of this invention. The present system 100 includes a central processing unit (CPU) 1 and a memory 4. CPU 1 and memory 4 are connected to hard disk drives 13, 30 as auxiliary storage devices via a bus 2 and the like. A floppy disk drive (or another storage medium drive such as an MO drive 28, CD-ROM drives 26, 29, hard disk drives 13, 30) 20 is connected to bus 2 via a floppy disk controller (or a variety of controllers such as an IDE controller 25, a SCSI controller 27) 19.

A floppy disk (or another storage medium such as an MO disk, a CD-ROM) 24 inserted into floppy disk drive (or another storage medium drive such as MO drive 28, CD-ROM drives 26, 29) 20, hard disk drive 13 and/or a ROM 14 is capable of storing a computer program code for practicing this invention. At the time of execution, this computer program code is loaded into memory 4 such that it cooperates with an operating system to provide instructions to CPU or the like. This computer program code may be compressed or divided into a plurality of segments for storing across a plurality of media. Similarly, each of said storage media is capable of storing input image data and processed image data as well.

Also, the present system 100 may be provided with user interface hardware, including a pointing device (such as a mouse, joystick, a track ball) 7 for inputting information of positions on a screen, a keyboard 6 for supporting key input, as well as a display 12 for presenting image data to a user. Also, a speaker 23 receives audio signals from an audio controller 21 via an amplifier 22, and outputs the audio signals as sounds.

Preferably, image data to be inputted into the present system 100 is created by a scanner 31 and provided to the present system 100 via SCSI controller 27. Alternatively, such image data created by scanner 31 may be inputted into the present system 100 via a parallel port 16 or another interface rather than SCSI controller 27. The present system 100 may communicate with another computer, a FAX machine or the like via a serial port 15 and a modem or a communication adapter 18 such as token ring type for receiving image data, or the present system 100 may receive an input from a storage medium such as floppy disk 24. Further, the present system 100 may be connected to a digital camera via serial port 15 for receiving image data therefrom.

It will be readily understood from the foregoing that this invention may be implemented by a conventional personal computer (PC), a workstation, a dedicated OCR, a computer incorporated into a variety of household electric appliances such as a TV set or a FAX machine, and any combinations thereof. Note, however, that these elements are listed for exemplification purpose only, and all of these elements are not necessarily equated with essential elements of this invention. In particular, since this invention is directed to recognition of a bitmap image, those elements such as serial port 15, communication adapter 18, audio controller 21, amplifier 22 and speaker 23 are non-essential elements in one aspect of this invention.

While it is desirable to use either one of those operating systems supporting a GUI multiwindow environment such as "Windows" (trademark of Microsoft Corp.), "OS/2" (trademark of IBM Corp.), "X-WINDOWS system" (trademark of MIT) on "AIX" (trademark of IBM Corp.), this invention is not limited to a particular operating system environment.

B. System Configuration

Next, with reference to a block diagram of FIG. 2, a system configuration of this invention will be described. In a preferred embodiment of this invention, the present image processing system 100 comprises a user input means 101, a control means 103, an image analysis means 105, an image display means 107, an image input means 111 and a definition set storage means 113.

User input means 101 has a function for receiving those inputs from a user, including instructions for starting/ending of processing and a coordinate value on a screen entered by using a pointing device, and for transmitting them to control means 103. Image input means 111 contains image information such as a document image input from scanner 31 (FIG. 1), and then transmits such image information to control means 103. Image analysis means 105 analyzes the image information contained in image input means 111, derives coordinate values or the like for specifying detected line segments, and then returns them to control means 103. Image display means 107 displays, on a display screen, the image information contained in image input means 111, position information of fields stored in definition set storage means 113, and attribute information. Respective functions of these functional blocks will be described below in more detail.

Figure 2:
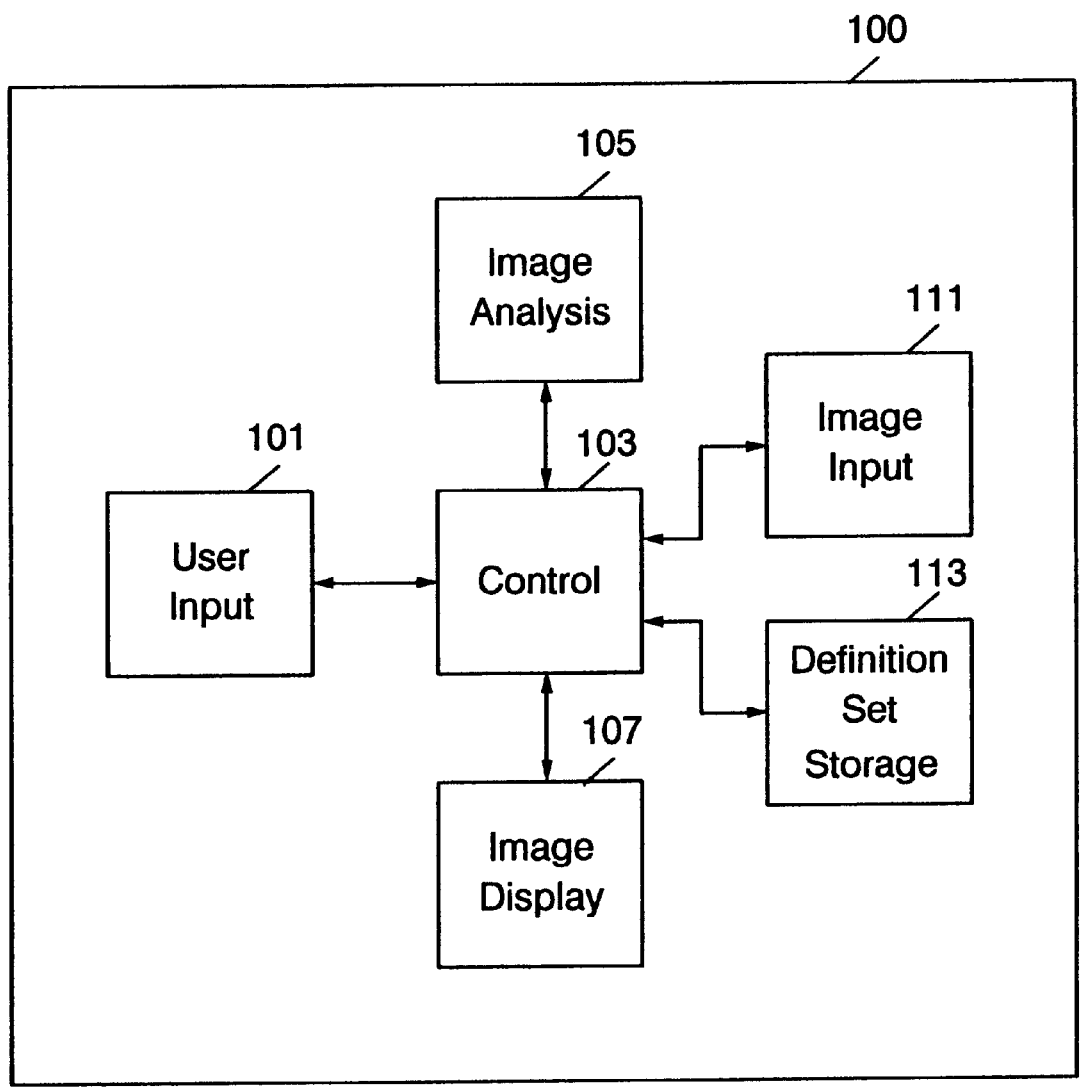
FIG. 2 is a block diagram showing an image processing system.

While each functional block shown in FIG. 2 has been described above, it is noted that these blocks are logical functional blocks. Thus, each of them is not necessarily implemented by bulky hardware/software components, but it may be implemented by combined or common hardware/software components.

C. Description of Operations

Application of this invention is not limited to an OCR alone, but it may be equally applied to recognition and identification of a general bitmap image as well. However, by way of example and for sake of brevity, we will mostly describe below a preferred embodiment of this invention where this invention is applied to an OCR.

When characters are to be recognized, OCR software having a document identifying function uses a pre-registered file (hereafter called "document definition set"), which describes positions of character fields, character attributes and the like, to identify a document that has characters actually filled therein, specifies character fields where the characters are filled in, and then recognizes/codes the characters.

Figure 3:
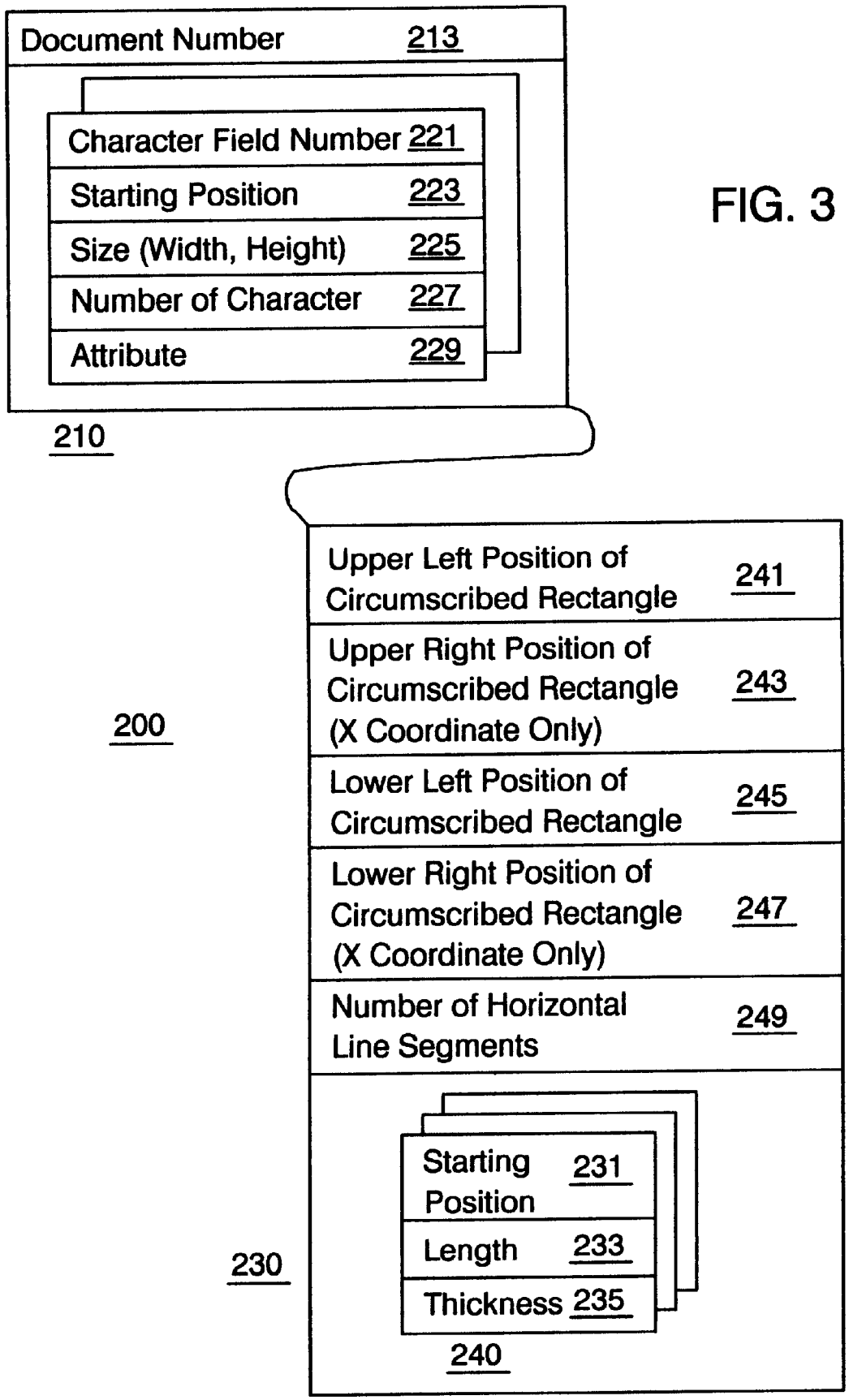
FIG. 3 is a conceptual diagram showing a document definition set.

FIG. 3 is a conceptual drawing showing contents of a document definition set 200 in a preferred embodiment of this invention, which comprises a document/character field definition information section 210 corresponding to a conventional document definition set, and a circumscribed rectangle/horizontal line segment definition information section 230 that has been improved by this invention. In this environment, definition set storage means 113 (FIG. 2) is rendered to store a plurality of document definition sets 200.

Document/character field definition information section 210 contains information of a document number 213. Also, for each of character fields included in the present document, this section 210 manages information of a character field number 221, a starting position 223 (a coordinate value of an upper left vertex), a size 225 (width and height), a number 227 of characters, attributes 229, and the like of the associated character field respectively.

On the other hand, circumscribed rectangle/horizontal line segment definition information section 230 is linked to document/character field definition information section 210 for each document, and the section 230 contains information of four corners of a circumscribed rectangle, including x/y coordinates 241 of an upper left corner, x coordinate 243 of an upper right corner, x/y coordinate 245 of a lower left corner, and x coordinate 247 of a lower right corner, in addition to a number of horizontal line segments 249. Also, for each of line segments included in the present document, this section 230 manages information of a starting position 231, a length 233, a thickness 235, and the like of the associated line segment respectively. With regard to such information 241 to 247 of said four corners contained in this section 230, it may be alternatively stored into definition areas of page marks/reference marks included in a conventional document definition set.

Now, for ease of understanding this invention, known techniques for generating a conventional document definition set (corresponding to document/character frame definition information section 210 of FIG. 3) will be briefly described. To generate definitions of a newly created OCR document for enabling a character recognition program to recognize the present document, a classical technique required to use a ruler for measuring a size of the present document, relative positions and sizes of page marks/position adjustment marks (a1alternatively called "timing marks" or "reference marks")/character fields/characters, and the like, thereby to input the measured values for generating a document definition set.

However, this technique placed a heavy burden on an operator (creator of a definition set) and, thus, some improved techniques have been proposed. To cite one example, as described in "WinReader Hand v1.5, Users' Manual, Setup of Field (pages 19, 20)" ("WinReader Hand" is a trademark of Media Drive laboratory, Inc.), there is a scheme for capturing an unfilled document image of a document with black frames by a scanner, displaying it on a display screen, automatically detecting all of black vertical lines and horizontal lines, prompting an operator to confirm that straight lines are correctly detected, and then setting up character recognition fields.

Figure 4B:
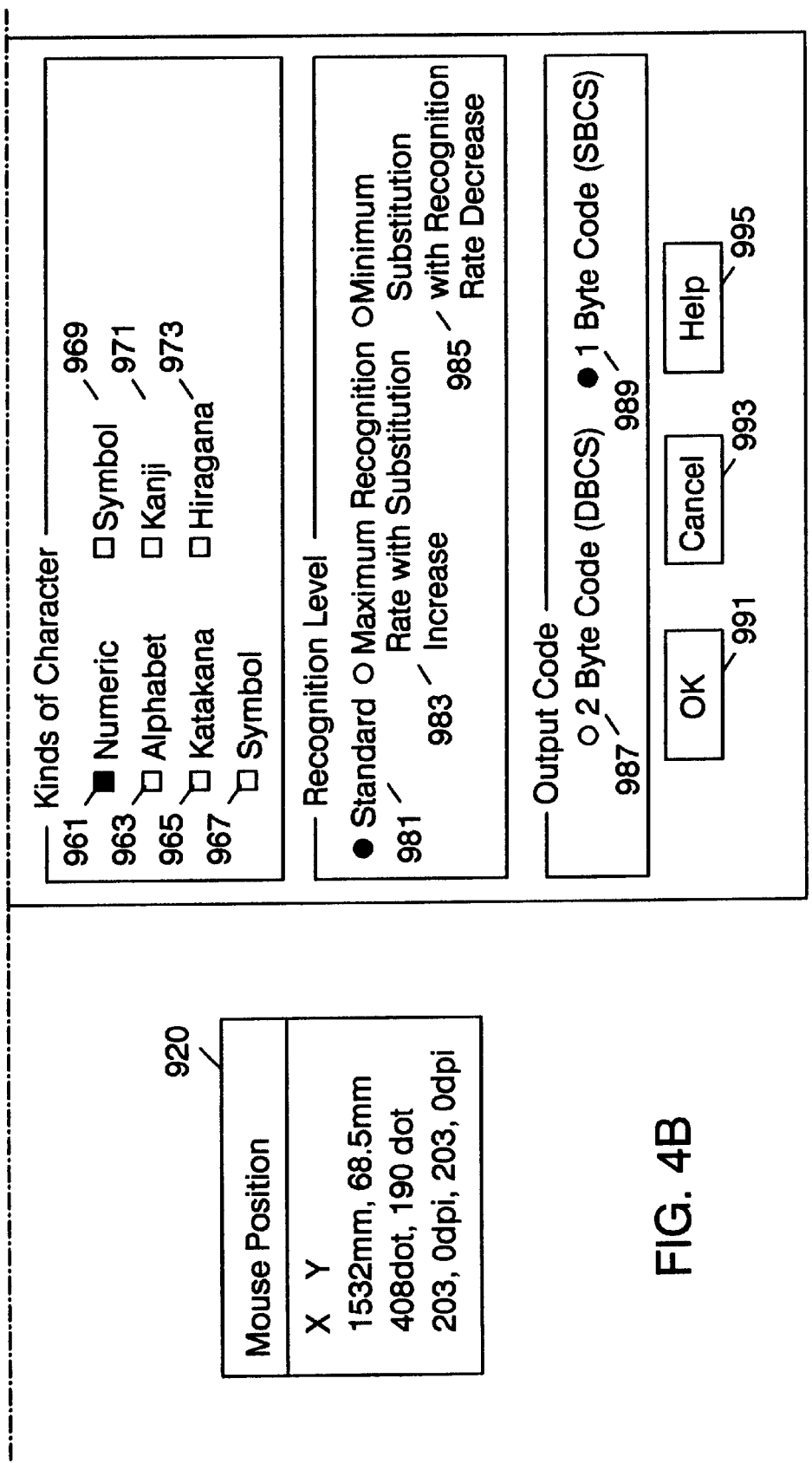
FIG. 4 is a diagram showing an example of a user interface for use in attribute definition.

Also, as described in Japanese Patent Application H8-317242, filed on Nov. 11, 1996 by the assignee of the current application, there is another technique for displaying a scanned image of a document including character frames on a display screen, clicking an inside of the leftmost character frame for each recognition field, then clicking an inside of the rightmost character frame in the same field, thereby automatically designating a field. In this invention, after execution of a character frame detection program, it is possible to carry out re-setting of the detected character frame and setting of attribute information, as shown in FIG. 4.

Setting of attributes of this field is advantageous in that it enables avoidance of errornenous recognition of a numeric character "0" in a numeric item as being an alphabetic character "O", and yet it enables fast recognition because of reduction of sets to be compared. In particular, in handwritten character recognition, characters are recognizable without using a document definition set including attribute information. However, due to the existence of some characters that are not easily distinguishable from each other, such as the numeric character "0" and the alphabetic character "O", it is much difficult to obtain a processing speed and/or a recognition rate adapted for practical use, and yet subsequent handling of the recognized characters (address, name, monetary amount, or the like) tends to be indefinite. Accordingly, a process for recognizing a document normally comprises two steps of: creating a document definition set; and recognizing an actual document on the basis of this document definition set.

This invention may be applied to these two steps in such OCR processing as well, i.e., creation of a document definition set and document identification/character recognition. Now, an exemplary application of this invention in each of these steps will be described.

C-1. Application to Create Document Definition Set

Figure 5:
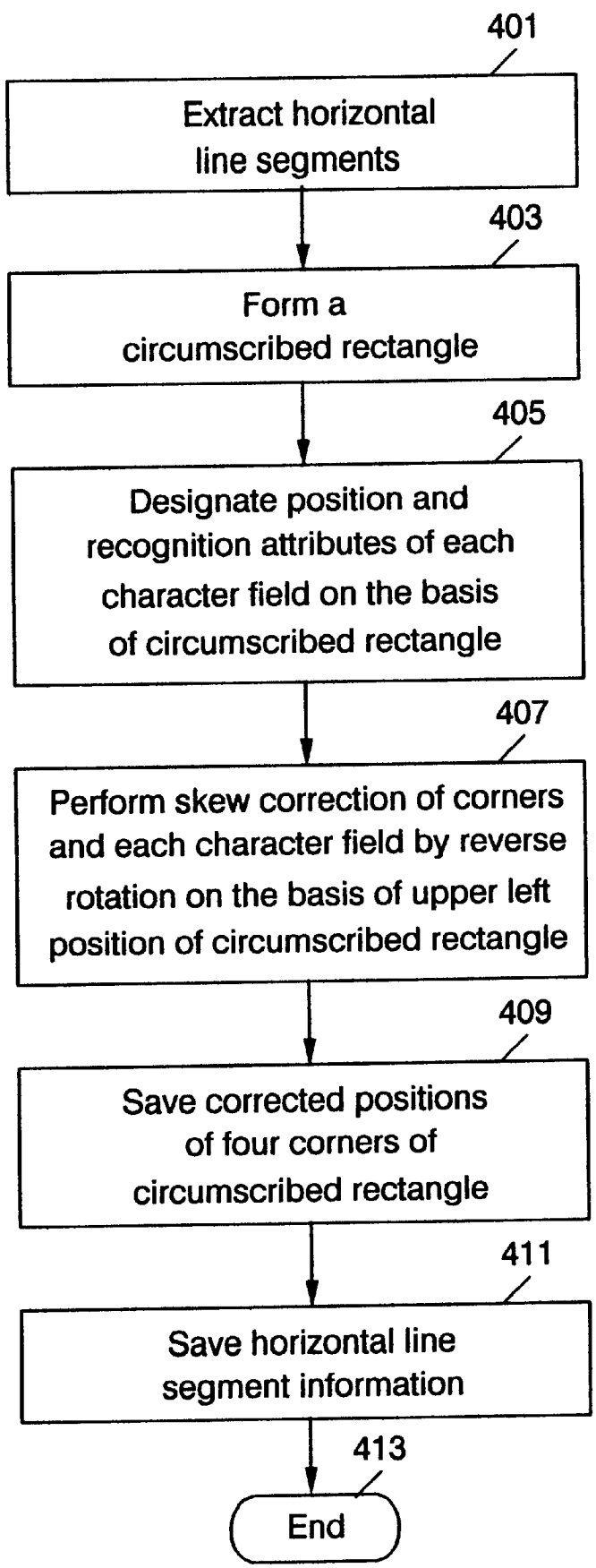
FIG. 5 is a flow chart showing procedures for creating a document definition set in a preferred embodiment of this invention.

As shown in FIG. 5, a process of creating a document definition set has the following procedures:

1. Extraction of horizontal line segments (block 401);
2. Formation of circumscribed rectangle (block 403);
3. Designation of position and recognition attributes of each character field on the basis of circumscribed rectangle (block 405);
4. Performing skew correction of corners and each character field by reverse rotation on the basis of upper left position of circumscribed rectangle (block 407);
5. Saving of corrected positions of four corners of circumscribed rectangle (block 409); and
6. Saving of horizontal line segment information (block 411).

C1.1. Extraction of Horizontal Line Segments

First, as a procedure for extracting horizontal line segments, only those horizontal line segments that are processible at high-speed by horizontally scanning a document image are detected. At this time, in order to avoid any detrimental effects caused by useless short line segments of characters, noises or the like, length and thickness of each horizontal line segment is limited to certain ranges. For example, line segments having a length less than 7 mm or a thickness less than 0.3 mm are to be disregarded.

Figure 6A:
FIG. 6 is a diagram showing an image of a document.
Figure 7:
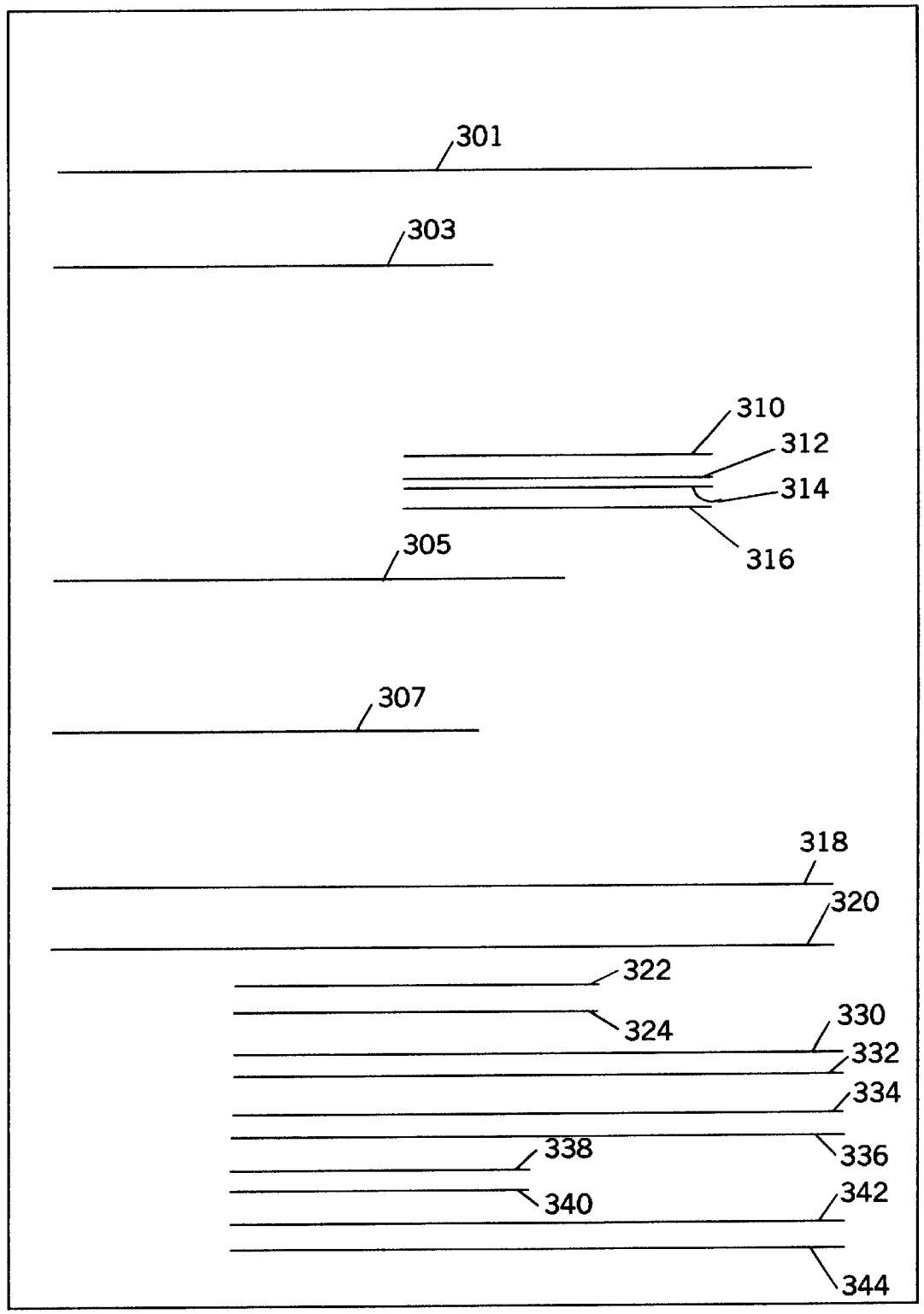
FIG. 7 is a conceptual diagram showing horizontal line segment extracted from a document image.

FIG. 6 shows a document used in a preferred embodiment of this invention, whereas FIG. 7 shows a conceptual diagram of line segments that have been extracted by said first procedure for extracting horizontal line segments. In a preferred embodiment of this invention, as line segment specifying information, x/y coordinates of a starting point and an ending point of each line segment (center of line width), and a thickness of each line segment are retained. It is also effective to retain information of a length of each line segment as a part of such line segment specifying information.

C1.2. Formation of Circumscribed Rectangle

Next, from a set of the extracted horizontal line segments, an averaged skew value unique to the present document is calculated, and then a circumscribed rectangle having this angle is formed. More particularly, from x/y coordinates of starting/ending points of the line segment information, a skew of each line segment is calculated, and then its averaged value is calculated as the above averaged skew value.

Figure 8A:
FIG. 8 is a conceptual diagram showing a circumscribed rectangle formed from a document image.

Also, from information of the minimum/maximum y coordinates, as well as the minimum/maximum x coordinates of starting/ending points of the line segments, four corner points of the circumscribed rectangle are retained as definition information of this circumscribed rectangle. FIG. 8 is a conceptual diagram showing a circumscribed rectangle formed by said second procedure for forming a circumscribed rectangle.

In one aspect of this invention, comparison with a document is carried out on the basis of a circumscribed rectangle that encompasses all of the detected line segments and, thus, it is possible to obtain a stable base that has the conceivably least error. If there is no detected horizontal line segment at a corner of the rectangle (if, as shown at a vertex 345 of FIG. 8, x coordinates of a horizontal line segment forming the circumscribed rectangle is not the maximum value or the minimum value of x coordinates of the detected horizontal line segments), it is calculated in accordance with a linear equation using the maximum value or the minimum value of x coordinates of the detected horizontal line segments.

The information so extracted through the above procedures of "C1.1. Extraction of Horizontal Line Segments" and "C1.2. Formation of Circumscribed Rectangle" is stored into circumscribed rectangle/horizontal line segment definition information section 230 (FIG. 3) linked to each document.

C1.3. Designation of Position and Recognition Attributes of Each Character Field on the Basis of Circumscribed Rectangle Using the upper left position of the circumscribed rectangle as an origin, a relative position of each character frame is determined. In a preferred embodiment of this invention, document/character field definition information section 210 (FIG. 3) is previously created as a conventional document definition set 200, to which circumscribed rectangle/ horizontal line segment definition information section 230 (FIG. 3) is to be subsequently added. In this aspect, values of x/y coordinates of starting position 223 of the said character frame is subtracted by values of x/y coordinates of the upper left position 241 (FIG. 3) of the circumscribed rectangle.

In another aspect of this invention, document/character field definition information section 210, as well as circumscribed rectangle/horizontal line segment definition information section 230 are defined in sequential processing. In this aspect, using the previously extracted upper left position 241 of the circumscribed rectangle as an origin, a known character frame detection program is executed to extract starting position 223 of each character frame.

Also, using the upper left position 241 and the upper right position 243 of the circumscribed rectangle as page marks, it is possible to use an existing program that uses conventional page marks without significantly modifying it.

C1.4. Performing Skew Correction of Corners and Each Character Field by Reverse Rotation on the Basis of Upper Left Position of Circumscribed Rectangle From the information of starting/ending points of each line segment obtained at block 401, a skew of the horizontal line segments (an averaged skew value) is calculated and, then using a rotational angle based on this skew, the remaining three corners of the circumscribed rectangle and the positions of character frames are computationally corrected by reverse rotation about the upper left corner of the circumscribed rectangle. The position information of the four corners of the circumscribed rectangle so calculated is then substituted for the position information 241 to 247 of the four corners of the circumscribed rectangle contained in document definition set 200. This enables fast processing, since such skew correction is carried out in a theoretical manner by mapping of the so-called position information alone without actual rotation of an image itself. Also, starting position 223 is replaced by the corresponding information obtained after the skew correction.

C1.5. Saving of Corrected Positions of Four Corners of Circumscribed Rectangle

Now, the corrected positions of the four corners of the circumscribed rectangle are saved as position information of the current page marks. In so doing, the corrected position information of the four corners may be used as virtual page marks by an existing character frame detection logic that uses conventional page marks.

C1.6. Saving of Horizontal Line Segment Information

As shown in FIG. 3, a variety of information including number of the detected horizontal line segments 249, starting position 231, length 233, thickness 235 and the like is saved into document definition set 200. Such information is used when a document is to be identified.

C2. Application to Document Identification/Character Recognition

Figure 9:
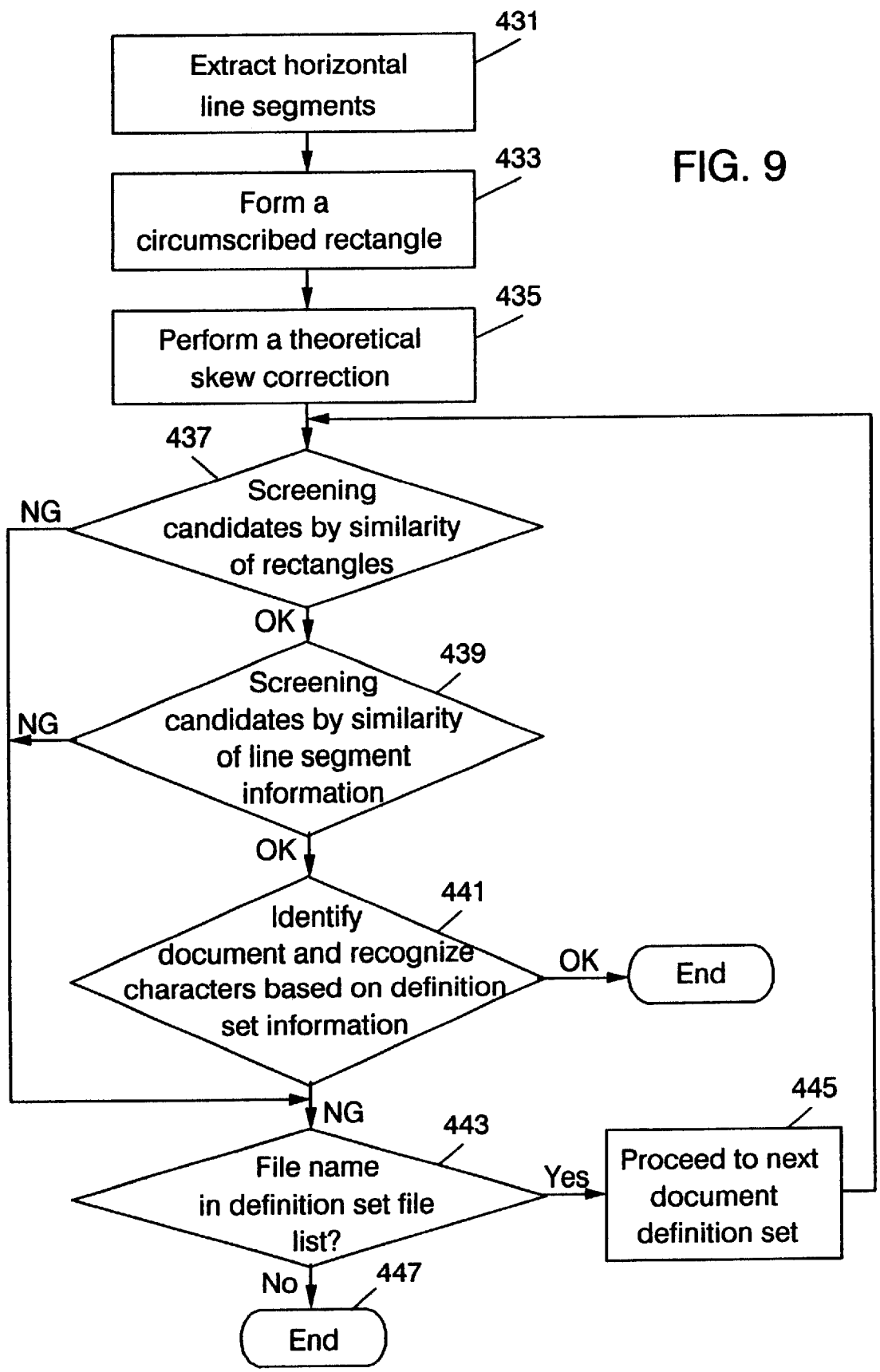
FIG. 9 is a flow chart showing procedures for document identification/character recognition in a preferred embodiment of this invention.

Now, an application of this invention to recognition of an actual document (a filled document) will be described. Note that such recognition is to be carried out after creation of document definition set 200. As shown in FIG. 9, a process for document identification/character recognition in a preferred embodiment of this invention comprises the following procedures:

1. Extraction of horizontal line segments (block 431);
2. Formation of circumscribed rectangle (block 433);
3. Theoretical skew correction (block 435);
4. Screening candidates by similarity of circumscribed rectangles (block 437);
5. Screening candidates by similarity of horizontal line segment information (block 439); and
6. Document identification and character recognition based on definition set information (block 441).

In the following description, it is assumed that a plurality of document definition sets uniquely associated with a class of document are stored in definition set storage means 113 (FIG. 2), and that an OCR system has no previous knowledge of which class of an input document corresponds with which document definition set. File names of the document definition sets are registered in a definition set file list.

C2.1. Extraction of Horizontal Line Segments

Similarly to the above document definition, only those horizontal line segments that are processible at high-speed by horizontal scanning from a document image are detected. Similarly, in order to avoid any detrimental effects caused by useless short line segments of characters, noises or the like, length and thickness of each horizontal line segment are limited to certain ranges.

C2.2. Formation of Circumscribed Rectangle

Similarly to the above document definition, from a set of the extracted horizontal line segments, an averaged skew value unique to the present document is calculated, and then a circumscribed rectangle having this angle is formed.

C2.3. Theoretical Skew Correction

Similarly to the above procedures of C1.3 and C1.4, positions of character frames and the like are detected and corrected. In so doing, even if skews or positions at the document definition time are deviated from those at the recognition time, it is possible to make them correspondent with each other on the same ideal image.

C2.4. Screening Candidates by Similarity of Circumscribed Rectangles

Vertical/horizontal lengths of the newly formed circumscribed rectangle are compared with vertical/horizontal lengths of the previously formed circumscribed rectangle, which are calculated from the information 241 to 247 of the four corners of the circumscribed rectangle contained in document definition set 200. If the similarity between them is greater than a certain threshold value, the process proceeds to a next procedure. If it fails, comparison of similarity with another document definition set is carried out (blocks 443, 445). Incidentally, in a preferred embodiment of this invention, the present document is checked to see whether or not there exists a document ID thereon, and if so, it is recognized and compared with document number 213 contained in document definition set 200, thereby to complete the document identification.

C2.5. Screening Candidates by Similarity of Horizontal Line Segment Information

The horizontal line segments extracted at block 431 are compared with the horizontal line segment information and positions/lengths within the rectangle that are contained in document definition set 200. If the similarity between them is greater than a certain threshold value, the process proceeds to a comparison step of a next horizontal line segment. In a preferred embodiment of this invention, it is assumed that the number of horizontal line segments may not be ultimately equal to each other. This is desirable for reducing effects caused by erroneous detection or detection failure of a horizontal line segment due to a filled character or the like. If the extracted horizontal line segments pass these similarity comparisons, the process proceeds to a next procedure. If they fail, comparison of similarity with another document definition set is carried out.

C2.6. Document Identification and Character Recognition Based on Definition Set Information Character recognition processing is carried out based on position information of four corners of the formed circumscribed rectangle, a rotational angle, position information of character frames, attribute information and the like that are contained in document definition set 200. (Similarly to the above document definition, position information of four corners of the circumscribed rectangle are regarded as virtual page marks, whereby an existing character frame detection logic using conventional page marks may be diverted to the detection thereof.) If the scanned document does not match an estimated document, then the process returns to the above procedure of C2.4 for checking another definition set. This error may be generated when documents are different from each other even in a case where horizontal line segments match each other, or when the threshold value for determining similarity of horizontal line segments is indulgent.

If the present document satisfies the conditions of blocks 437, 439 and 441, it is then subjected to OCR processing as a document matching the document of its definition set. If the present document does not match any document defined in either one of document definition sets 200, it is determined that an unrecognizable document has been entered and then its error processing is carried out.

[Advantages of the Invention]

As described above, in accordance with this invention, it is possible to designate character frames and to recognize characters even where a document does not have any page mark or reference mark nor does a scanner have a function for detecting an edge of a document.

Also, in accordance with this invention, it is possible to carry out identification processing of a bitmap image in an accerelated manner by comparing bitmap images on the basis of a circumscribed rectangle formed solely from horizontal line segments that are recognizable at high-speed.

Also, in accordance with this invention, it is possible to carry out identification processing of a bitmap image in an accerelated manner by mapping an image into an ideal image without performing actual skew correction of an image itself.

Further, in accordance with this invention, it is possible to simplify an involved logic by treating four corners of a circumscribed rectangle as virtual page marks such that an existing logic designed to detect a character frame based on a conventional page mark may be diverted to detection of the virtual page marks.

Moreover, in accordance with this invention, it is possible to reduce burdens of an operator who is to create a document definition set by making it possible to add definition information of a circumscribed rectangle or horizontal line segments to an existing document definition set such that information of a conventional document definition set may be utilized as it is.

What is claimed is:

1. A method of identifying a class of a bitmap image including a plurality of horizontal line segment images, the method being carried out on a bitmap image identifying apparatus that has a bitmap image definition set containing information for identifying a plurality of bitmap images, comprising the steps of:

(a) scanning said bitmap image to extract information for specifying a plurality of horizontal line segments which line segments are substantially parallel to the direction of the scanning of the bitmap image;

(b) extracting information for specifying a circumscribed rectangle based on said information for specifying the plurality of horizontal line segments and circumscribing the plurality of horizontal line segments;

(c) using information extracted in step (b) as at least one virtual reference mark for specifying if the circumscribed rectangle is similar to pre-registered information for specifying a circumscribed rectangle in a bitmap image definition; and (d) checking whether or not said extracted information for specifying a plurality of horizontal line segments is similar to pre-registered information for specifying horizontal line segments in said bitmap image definition set so that the class of bitmap can be determined using a self generated reference mark.

2. The method of claim 1 including the step of:

(e) generating said bitmap image definition set using steps (a) and (b).

3. The method of claim 2 including the step of:

(f) using the extracted information for the top and bottom horizontal line segments of said plurality of horizontal line segments at least in part for specifying the top and bottom sides of said circumscribed rectangle.

4. The method of claim 3 including the step of:

(g) referencing the extracted information for specifying the plurality of horizontal line segments to the at least one virtual reference mark.

5. A method of obtaining information for identifying a class of a bitmap image including a plurality of horizontal line segment images, comprising the steps of:

(a) scanning said bitmap image to extract information for specifying a plurality of horizontal line segments which horizontal line segments are substantially parallel to the direction of scanning the bitmap images;

(b) extracting information for specifying a rectangle, which contains at least a portion of two of said plurality of horizontal line segments as its horizontal sides, which specification of the rectangle is based on said information for specifying a plurality of horizontal line segments extracted in step (a) without the use of information for specifying vertical line segments;

(c) transforming said information for specifying a rectangle and said plurality of horizontal line segments based on skew information calculated from said information for specifying a plurality of horizontal line segments; and (d) storing said transformed information for specifying a rectangle for use of at least one of the vertexes of the specified rectangle as a virtual reference mark.

6. A bitmap image identifying apparatus for identifying a class of a bitmap image including a plurality of horizontal line segment images, comprising:

(a) image input means for providing said bitmap image including a plurality of horizontal line segments;

(b) a bitmap image definition set including information for identifying classes of a plurality of bitmap images; and (c) image analysis means (c1) for scanning substantially parallel to the plurality of horizontal segments in said bitmap image to extract information for specifying the plurality of horizontal line segments, (c2) for extracting information for specifying a circumscribed rectangle based on said information for specifying a plurality of horizontal line segments and circumscribing the plurality of horizontal line segments and (c3) for checking whether or not said extracted information for specifying a circumscribed rectangle is similar to pre-registered information for specifying a circumscribed rectangle in said bitmap image definition set.

7. A bitmap image processing apparatus for recognizing a position of a character frame included in a bitmap image, comprising:

(a) image analysis means (a1) for scanning said bitmap image to extract information for specifying a plurality of horizontal line segments aligned substantially with the direction of the scanning, (a2) for extracting information for specifying a circumscribed rectangle circumscribing the plurality of horizontal lines based on said information for specifying a plurality of horizontal line segments without extracting information specifying vertical lines, and (a3) for extracting information for specifying a character frame included in said bitmap image which character frame has horizontal sides comprising two of line segments in the plurality of line segments; and (b) a bitmap image definition set for storing said extracted information for specifying a character frame as position information on the basis of a virtual index comprising one of vertexes of said circumscribed rectangle whereby the position of the character frame can be quickly determined without the use of preprovided index information for the bitmap image.

8. A storage medium for storing an image processing program executable on a bitmap image processing apparatus, said image processing program recognizing a position of a character frame included in a bitmap image, said image processing program comprising:

(a) program code for having said bitmap image processing apparatus scan said bitmap image to extract information for specifying a plurality of horizontal line segments arranged substantially parallel to the direction of the scanning;

(b) program code for having said bitmap image processing apparatus extract information for specifying a circumscribed rectangle circumscribing the plurality of horizontal line segments based on said information for specifying a plurality of horizontal line segments;

(c) program code for having said bitmap image processing apparatus extract information for specifying a character frame included in said bitmap image and having two of the horizontal line segments in the plurality of horizontal line segments as top and bottom sides thereof; and (d) program code for indicating said bitmap image processing apparatus to store said extracted information for specifying a character frame as position information on the basis of one of vertexes of said circumscribed rectangle so that the position of the character frame can be quickly determined without page marks on the document from which the bit images were derived.

9. A storage medium for storing an image processing program executable on a bitmap image identifying apparatus that has a bitmap image definition set containing information for identifying a plurality of bitmap images, said image processing program identifying a class of a bitmap image including a plurality of horizontal line segment images, said image processing program comprising:

(a) program code for having said bitmap image identifying apparatus scan said bitmap image to extract information for specifying a plurality of horizontal line segments aligned substantially parallel to the direction of the scan;

(b) program code for having said bitmap image identifying apparatus extract information for specifying a circumscribed rectangle based on said information for specifying a plurality of horizontal line segments without use of information specifying vertical lines; and (c) program code for having said bitmap image identifying apparatus check whether or not said extracted information for specifying a circumscribed rectangle is similar to pre-registered information for specifying a circumscribed rectangle in said a bitmap image definition set so that the bitmap images can be quickly identified without otherwise identifying the bitmap image configurations.

10. A storage medium for storing an image processing program executable on a bitmap image processing apparatus, said image processing program obtaining information for identifying a class of a bitmap image including a plurality of horizontal line segment images, said image processing program comprising:

(a) program code for having said bitmap image processing apparatus scan said bitmap image to extract information for specifying a plurality of horizontal line segments arranged substantially parallel to the direction of the scanning;

(b) program code for having said bitmap image processing apparatus extract information for specifying a rectangle, which contains at least a portion of two of said plurality of horizontal line segments as its horizontal side, based on said information for specifying a plurality of horizontal line segments, extracted in step (a) without the use of information for specifying vertical line segments (c) program code for having said bitmap image processing apparatus transform said information for specifying a rectangle based on skew information calculated from said information for specifying a plurality of horizontal line segments;

(d) program code for having said bitmap image processing apparatus store said transformed information for specifying a rectangle; and (e) program code for using said transformed information to identify the class by comparing it to previously stored transformed information for specifying a rectangle.

11. The image processing program of claim 10 including:

program code for generating the previously stored transformed information for specifying a rectangle using the program code of (a), (b) and (c).

* * * * *